April 29, 1958     H. O. KOONS     2,832,906

SINGLE BEARING ROTATING ELECTRICAL EQUIPMENT

Filed March 5, 1956     2 Sheets-Sheet 1

INVENTOR.
HAROLD O. KOONS
BY
*Alfred G. Body*
ATTORNEY

April 29, 1958     H. O. KOONS     2,832,906
SINGLE BEARING ROTATING ELECTRICAL EQUIPMENT
Filed March 5, 1956     2 Sheets-Sheet 2

*INVENTOR.*
HAROLD O. KOONS
BY
*Alfred C. Boehy*
ATTORNEY

United States Patent Office 2,832,906
Patented Apr. 29, 1958

2,832,906

SINGLE BEARING ROTATING ELECTRICAL EQUIPMENT

Harold O. Koons, Willoughby, Ohio, assignor to The Electric Products Co., Cleveland, Ohio, a corporation of Ohio Application March 5, 1956, Serial No. 569,394

5 Claims. (Cl. 310—90)

This invention pertains to the art of rotating electrical equipment and, more particularly, to such equipment wherein the rotor is supported by a single bearing spaced from the center of gravity. Such equipment is generally referred to as having an "overhung" rotor.

The invention is particularly applicable to the field of large electrical motors employed for driving pumps or compressors, and will be described with particular reference to same although it will be appreciated that the invention is not so limited and can be employed in other manners such as, without limitation, motor generator units or the like.

In the art of overhung, single bearing electric motor driven pumps and compressors, the motor and the compressor are mounted on a common base with the motor shaft direct coupled to the pump shaft. The bearings of the pump shaft thus support the overhung weight. It is necessary that the axes of rotation of the two shafts be exactly aligned and by exactly aligned, it is meant that the axes not only exactly coincide at the abutting ends of the shafts but on any extension of either axis.

If the axes of rotation are not so aligned, undue bearing pressure results, resulting in their early destruction. Alternatively, the shaft has a bending action induced therein by the rotation of the members which can cause vibration and possible fatigue failure of one or both of the shafts.

This exact alignment of the axes of rotation must not only be established when the motor and compressor are first installed but must be so maintained through operation, notwithstanding the effects of vibration or even warpage of the supporting base which might cause the two axes to move into misalignment.

The present invention contemplates rotary electrical apparatus of the type wherein the rotor has a single supporting bearing and the apparatus to which the rotor is adapted to be mechanically connected provides the other supporting bearing which overcomes all of the above-referred to difficulties and others and provides a simple arrangement for connecting such apparatus which eliminates the necessity for exact alignment of the axes of rotation.

In accordance with the present invention, rotary electrical apparatus of the general type described is provided comprised of a shaft, a single bearing rotatably supporting the shaft and means interconnecting the shaft with the machine to which the apparatus is adapted to be connected comprising a member flexible in an axial direction and rigid in a radial direction, whereby the overhung weight of the apparatus rotor is transmitted to the machine shaft without flexure and the two axes of rotation may be out of exact alignment.

Still further in accordance with the invention, apparatus of the general type described is provided comprising a rotor shaft, a single bearing supporting one end of the shaft, an axial opening in the other end of said shaft, a sleeve in said opening adapted to receive the shaft of the machine to which the apparatus is to be connected and means flexible in an axial direction and rigid in a radial direction between said sleeve and the end of said shaft remote from the single bearing support.

The principal object of the invention is the provision of a new and improved rotary electrical apparatus of the general type described which is simple in construction and enables rotary electrical apparatus to be mechanically connected to and supported by the shaft of another machine without requiring exact alignment of the axes of rotation of the two shafts.

Another object of the invention is the provision of a new and improved single bearing rotary electrical apparatus and a multiple bearing machine to which the apparatus is mechanically connected which can be put into operation in the minimum of time and which is unaffected by slight misalignment of the axes of rotation.

The invention may take physical form in certain parts and arrangement of parts, a preferred embodiment of which will be described in detail in this specification and illustrated in the accompanying drawings which form a part hereof and wherein.

Figure 1:
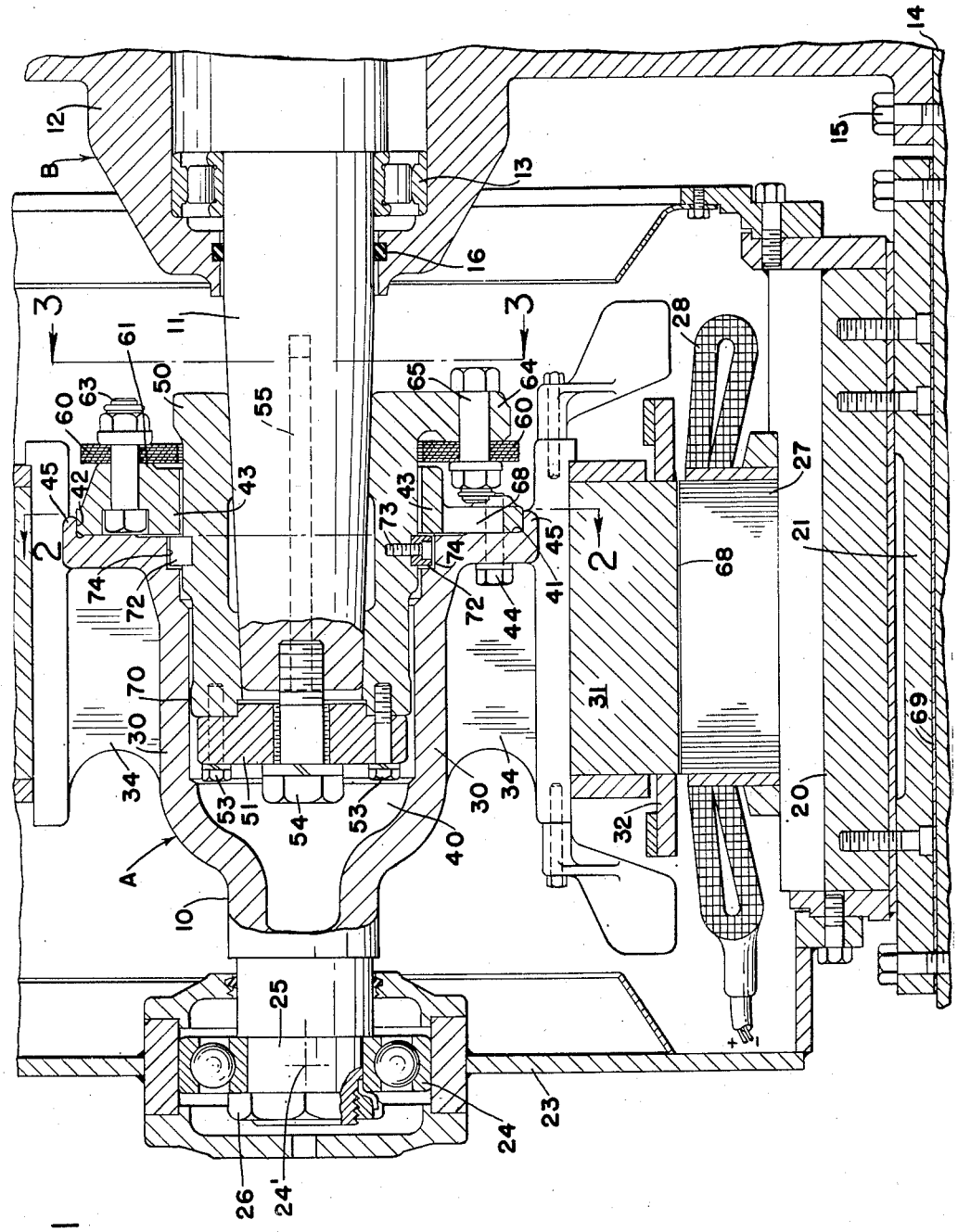
Figure 1 is a partial side sectional view of a synchronous alternating motor and a pump embodying the present invention, the section line being taken approximately on the line 1—1 of Figure 3.
Figure 2:
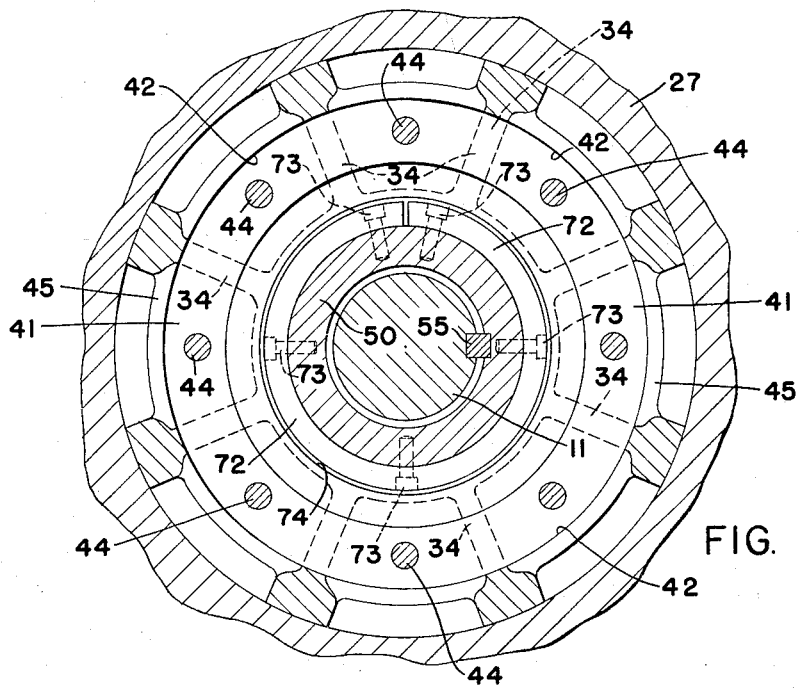
Figure 2 is a cross-sectional view of Figure 1 taken approximately on the line 2—2 thereof; and, Figure 3 is a cross-sectional view of Figure 1 with portions broken away for the purposes of clarity taken approximately on the line 3—3 thereof.

Referring now to the drawings, wherein the showings are for the purposes of illustrating a preferred form which the invention may take and not for the purposes of limiting same, there is shown rotary electrical apparatus A having a shaft 10 directly connected to the shaft 11 of a rotary machine B.

The machine B may be of any desired type such as a pump or compressor having preferably a plurality of bearings to support the shaft 11. In the embodiment shown, only a fragmentary portion of the machine B is shown including a housing 12 in which the shaft 11 is rotatably supported by a bearing 13. The housing 12 is fastened to a base 14 by hold-down bolts 15. As shown, the shaft 11 extends to the left of the housing 12 and a grease and dirt seal in the form of an O-ring 16 is provided between the outside of the housing 12 and the bearing 13.

The rotary electrical apparatus A may be either a motor or generator but is shown in the preferred embodiment as being a synchronous type electric motor. This apparatus A includes a fabricated housing comprised of a circular outer shell 20 and a base 21 rigidly fastened to the base 14 which is common to both the apparatus A and the machine B. The housing of the apparatus A also includes an end bell 23 in which a roller bearing 24 is mounted and into which a reduced portion 25 on the left end of the shaft 10 extends and is held in position by a nut 26 threaded onto the end of the shaft.

The apparatus A also includes a stator made up of a stack of laminations 27 and windings 28, as is conventional in the electric motor art.

In the embodiment shown, the shaft 10 has an enlarged integral cylindrical portion 30 having a plurality of axial webs 34 extending radially outwardly therefrom on which the rotor laminations 31 and the rotor bars 32 are mounted, again as is conventional in the motor art.

It will be noted that the apparatus A only has a single bearing 24 for rotatably supporting the shaft 10. The other bearing for supporting the overhung weight on the shaft 10 is included in the machine B to which the motor A is direct connected.

For providing this driving connection, the enlarged portion 30 of the shaft A has an axial bore or opening 40 from its right-hand end. The portion 30 also has an axially facing surface 41 perpendicular to the axis of rotation of the shaft 10 and a radially inwardly facing surface 42 coaxial with the axis of rotation formed on a flange 45. A ring 43 abuts against the surface 41 and is accurately located relative to the axis of rotation by the surface 42. This ring is held in position by a plurality of bolts 44 and is located relative to the axis by the surface 42.

The left-hand end of the shaft 11 tapers toward the end and has a sleeve 50 having a corresponding inner taper fitted thereover, which sleeve is pressed into a snug fit by means of a cap 51 fastened to the left end of the sleeve 50 by bolts 53 and drawn toward the end of the shaft 11 by means of a bolt 54. A key 55 fitting into keyways in both the surface of the shaft 11 and the inner surface of the sleeve 50 provides a driving connection between the two.

Figure 3:
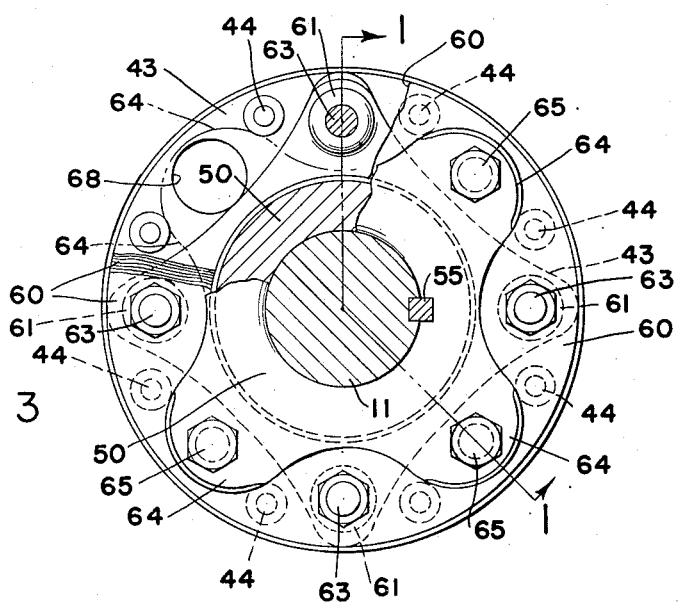

The sleeve 50 and the ring 43 are mechanically interconnected by means which are flexible in an axial direction and rigid in a radial direction. Thus, in the embodiment of the invention shown, a ring 60 is fastened to the right-hand end of four axially extending bosses 61 integral with the ring 43 by means of a nut and bolt 63. These bosses 61 are spaced 90° as is more clearly shown in Figure 3.

The right-hand end of the sleeve 50 has four equally spaced radially extending lugs 64 fastened to the opposite surface of the ring 60 by means of a nut and bolt arrangement 65. As is clearly shown in Figure 3, the bosses 61 and the lugs 64 are spaced approximately 45° from each other. The ring 43 has openings 68 opposite the bolts 65 to provide clearance therefor.

The rings 60, as previously indicated, is flexible in an axial direction but rigid in a radial direction. This function may be achieved in a number of different manners but in the preferred embodiment, the ring 60 is made up of a stack of relatively ring-like laminations of spring steel. As is apparent, the ring 60 has a high section modulus in a radial direction, giving to the ring a very high degree of rigidity in the radial direction. On the other hand, in an axial direction the ring 60 has a very low sectional modulus and thus is quite flexible in this direction.

The ring 60, in accordance with the invention, must have a modulus of elasticity on the order of that of metals or of the rigid plastics. Rubber or the other pliable materials having a low modulus of elasticity are entirely unsatisfactory for this purpose.

With the arrangement shown, the weight on the shaft 10 not supported by the bearing 24, can be transmitted to the ring 43 through the bosses 61 to the ring 60, thence through the ring 60 to the lug 64 to the sleeve 50, to the shaft 11 and thence to the bearing 13. Because of the rigidity of the ring 60 in a radial direction, all of the unsupported weight on the shaft 10 is thus fully supported the same as though the right-hand end of the shaft 10 did have its own supporting bearing.

In apparatus of this general type, the outer surface of the rotor laminations 31 has a narrow air gap 68 between itself and the inner surface of the stator 27. In installing apparatus of the type to which this invention pertains, it is a simple matter to locate the apparatus A relative to the axis of rotation of the shaft 11 by moving the apparatus A around on the base 14 and by placing shims 69 between the base 21 and the base 14 until the air gap 68 is uniform around its entire circumference.

However, the problem of locating the center point 24′ of rotation of the bearing 24 exactly on the extended axis of rotation of the shaft 11 is not a simple matter. In accordance with the present invention, however, it is not necessary that this center point be so exactly located. Thus, if the center point 24′ is displaced from the extended axis of rotation, the ring 60 by flexing slightly in an axial direction permits satisfactory operation of the apparatus A without causing undue bearing pressures or undue flexures elsewhere in the apparatus.

It is, of course, desirable that the point 24′ be located approximately on the extended axis of rotation and in the embodiment shown, the outer left-hand surface of the sleeve 50 is so dimensioned as to provide a small air gap 70 between itself and the inner surface of the bore 40. If the amount of clearance at this point is known, eventual adjustment and alignment of the apparatus A to the machine B is facilitated. Also, excessive flexure on the ring 60 is prevented.

In this respect, a ring 72 fits into a groove in the outer surface of the sleeve 50 and is held there by screws 73. This ring fits into a groove formed by a counter-bore 74 at the right end of the bore 40 and the left-hand surface of the ring 43 which, as shown, extends radially inwardly to a point just slightly beyond the outer radial surface of the counter-bore 74. The purpose of the ring 72, which is shown as spaced from the surfaces of the groove, is again to prevent undue axial flexure of the ring 60.

The present invention has facilitated the rapid installation of large motors driving large compressors or pumps, inasmuch as the time required for alignment of the center point of the bearing 24 with the extended axis of rotation of the shaft 11 has been very substantially reduced. Also, the operator of the machine need not worry about vibration or warpage of the various structural elements involved causing this center point from being displaced and thus ultimately causing undue bearing wear.

The invention has been described in connection with a preferred embodiment for the purpose of illustrating the invention. Obviously, modifications and alterations will occur to others upon a reading and understanding of the specification and it is my intention to include all such modifications and alterations insofar as they come within the scope of the appended claims.

Having thus described my invention, I claim:

1. Rotating electrical apparatus comprising, in combination: a housing, a bearing in said housing, a rotor member rotatably supported by said bearing, said rotor member having an axially extending opening spaced from said bearing, a sleeve in said opening having means adapted to be connected to the shaft of a machine to be driven by said rotor member, and a ring-like member bearing against and fastened to said rotor member at circumferentially spaced points and connected to said sleeve at circumferentially spaced points and intermediate the connection points to said rotor member, said ring-like member being rigid in a radial direction and flexible in an axial direction.

2. Rotating electrical apparatus comprising, in combination: a housing, a bearing in said housing, a rotor member rotatably supported by said bearing, said rotor member having an axially extending opening spaced from said bearing, a sleeve in said opening having means adapted to be connected to the shaft of a machine to be driven by said rotor member, a ring-like member bearing against and fastened to said rotor member at circumferentially spaced points and connected to said sleeve at spaced points and intermediate from the connection points to said rotor member, said ring-like member being rigid in a radial direction and flexible in an axial direction, and means limiting the radial movement of said sleeve relative to the opening of said rotor member at a point axially spaced from said ring-like member.

3. Rotating electrical apparatus comprising, in combination: a rotor member, a housing, a single bearing mounted in said housing and supporting said rotor member at one end, said rotor member having an axially extending opening axially spaced from said bearing, a sleeve member in said opening adapted to receive the shaft of a machine to be direct connected to said apparatus, a ring-like member flexible in an axial direction and inflexible in a radial direction connected to spaced points on said rotor member and spaced points on said sleeve and means limiting the radial and axial movement of said sleeve relative to said rotor member.

4. Rotating electrical apparatus comprising, in combination: a rotor, a single bearing at one end of said rotor and rotatably supporting same, said rotor having an axially extending opening spaced from said bearing, a sleeve positioned in said opening extending axially therebeyond, said rotor having an axially facing surface and an outer radially inwardly facing surface, a ring member bearing against both said surfaces and having axially extending bosses equally circumferentially spaced from each other, said sleeve member having radially extending lugs equally circumferentially spaced from each other and intermediate said bosses, and a second ring member fastened to both said lugs and said bosses, said second ring member being flexible in an axial direction and rigid in a radial direction.

5. Rotating electrical apparatus, comprising, in combination: a rotor, a single bearing at one end of said rotor and rotatably supporting same, said rotor having an axially extending opening spaced from said bearing, a sleeve positioned in said opening extending axially therebeyond, said rotor having an axially facing surface and an outer radially inwardly facing surface, a ring member bearing against both said surfaces and having axially extending bosses spaced 90° from each other, said sleeve member having radially extending lugs spaced 90° from each other and 45° from said bosses, a second ring member fastened to both said lugs and said bosses, said second ring member being flexible in an axial direction and rigid in a radial direction, and means axially spaced from said ring member limiting the radial and axial movement of said sleeve relative to the surfaces of the opening of said rotor.

References Cited in the file of this patent

UNITED STATES PATENTS

| | | |
|---|---|---|
| 1,458,601 | Tanner | June 12, 1923 |
| 1,504,608 | Cowin | Aug. 12, 1924 |
| 1,636,290 | Davey et al. | July 19, 1927 |
| 1,636,293 | Davey | July 19, 1927 |